United States Patent
Lee et al.

(10) Patent No.: US 8,611,857 B2
(45) Date of Patent: Dec. 17, 2013

(54) METHOD FOR AUTHENTICATING A UNIVERSAL SUBSCRIBER IDENTITY MODULE AND SYSTEM THEREOF

(75) Inventors: Jung Hyo Lee, Daejeon (KR); Youn Seog Choi, Deajeon (KR)

(73) Assignee: KT Corporation, Kyeonggi-do (KR)

( * ) Notice: Subject to any disclaimer, the term of this patent is extended or adjusted under 35 U.S.C. 154(b) by 0 days.

(21) Appl. No.: 13/378,564

(22) PCT Filed: Jun. 16, 2010

(86) PCT No.: PCT/KR2010/003860
§ 371 (c)(1),
(2), (4) Date: Feb. 27, 2012

(87) PCT Pub. No.: WO2010/147379
PCT Pub. Date: Dec. 23, 2010

(65) Prior Publication Data
US 2012/0282898 A1     Nov. 8, 2012

(30) Foreign Application Priority Data
Jun. 16, 2009    (KR) .................. 10-2009-0053244

(51) Int. Cl.
*H04M 1/66*    (2006.01)
(52) U.S. Cl.
USPC ............ 455/410; 455/411; 455/558; 713/168
(58) Field of Classification Search
USPC .......................... 455/410, 411, 558; 713/168
See application file for complete search history.

(56) References Cited

U.S. PATENT DOCUMENTS

| | | | |
|---|---|---|---|
| 2006/0126442 A1* | 6/2006 | Hirano et al. ................. | 368/223 |
| 2009/0004806 A1* | 1/2009 | Siprak ........................... | 438/306 |
| 2009/0199005 A1* | 8/2009 | Terada et al. ................. | 713/172 |
| 2010/0017626 A1* | 1/2010 | Sato et al. ..................... | 713/193 |
| 2010/0083006 A1* | 4/2010 | So et al. ....................... | 713/193 |

FOREIGN PATENT DOCUMENTS

| | | |
|---|---|---|
| KR | 1020010112618 | 12/2001 |
| KR | 1020060049267 | 5/2006 |
| KR | 1020090015736 | 2/2009 |

OTHER PUBLICATIONS

International Search Report published on Apr. 14, 2011 for International Patent Application PCT/KR2010/003860 filed on Jun. 16, 2010.

* cited by examiner

*Primary Examiner* — Danh Le
(74) *Attorney, Agent, or Firm* — IP & T Group LLP

(57) ABSTRACT

Disclosed are a method for authenticating a universal subscriber identity module (USIM) and a system thereof. The method for authenticating a universal subscriber identity module according to one embodiment of the present invention comprises: a step of determining whether the memory address for the USIM is stored when a USIM authentication-related message is received through a switch; a step of updating the memory address to a first memory address in which the memory address is increased by a predetermined value, if it is determined that the memory address is stored; a step of generating an authentication vector including the first memory address; and a step of transmitting the authentication vector to the USIM via the switch such that the USIM performs an authentication using the authentication vector.

10 Claims, 6 Drawing Sheets

(a)

(b)

METHOD FOR AUTHENTICATING A UNIVERSAL SUBSCRIBER IDENTITY MODULE AND SYSTEM THEREOF

This application is a national stage application of PCT/KR2010/003860 filed on Jun. 16, 2010, which claims priority of Korean patent application number 10-2009-0053244 filed on Jun. 16, 2009. The disclosure of each of the foregoing applications is incorporated herein by reference in its entirety.

TECHNICAL FIELD

The present invention relates, in general, to a method and system for authentication of a Universal Subscriber Identity Module (USIM) and, more particularly, to a method and system for authenticating a USIM, which can prevent the failure of authentication and the impossibility of call service that may occur due to partial damage to memory provided in the USIM during an authentication algorithm (Authentication and Key Agreement: AKA) for Universal Mobile Telecommunications System (UMTS), and which can also reduce costs that may be incurred by replacing USIMs.

BACKGROUND ART

Authentication has been standardized in International Mobile Telecommunication 2000 (IMT-2000), which is a 3rd generation mobile communication scheme, for example, Wideband Code Division Multiple Access (WCDMA), and in Global System for Mobile Communications (GSM), which is one of 2nd generation mobile communication schemes and has compatibility with IMT-2000.

Authentication is realized by mounting, on a subscriber mobile station such as a mobile phone or a wireless terminal, a Universal Subscriber Identity Module (USIM) or a Subscriber Identity Module (SIM), which is a typical subscriber identity module issued by a network service provider or the like having a service contract with the subscriber of a mobile communication network. Authentication refers to mutual authentication required upon call origination and termination between the mobile communication network serviced by the network service provider or the like and a subscriber identity module (USIM or SIM).

In order for a mobile station to be provided with call service, a subscriber identity module is authenticated. A conventional procedure for authenticating a USIM using UMTS Authentication and key agreement (AKA) is performed in such a way that when the mobile station sends an authentication request message for the USIM to an authentication server via a mobile switching center such as Visitor Location Register (VLR) and Serving GPRS Support Node(SGSN), the authentication server transmits authentication vector(s) required to perform authentication to the mobile station, and the USIM performs authentication using a memory address, which relates to an index value used in the array scheme of the USIM, and a sequence number included in the authentication vector.

That is, when preset authentication conditions are satisfied using the sequence number of the memory address included in the authentication vector and the sequence number included in the authentication vector, it is determined that authentication has succeeded and then the sequence number of a relevant memory address is replaced with and stored as the sequence number included in the authentication vector, whereas when the preset authentication conditions are not satisfied, it is determined that authentication has failed.

In this case, when authentication has failed, the USIM transmits the maximum sequence number separately stored in memory and a memory address corresponding thereto, for example, 550[10], where 550 corresponds to the maximum sequence number and [10] corresponds to memory address, to the VLR/SGSN, and the VLR/SGSN sends an authentication failure message to the authentication server such as Home Environment (HE) or Home Location Register (HLR). Accordingly, the HE/HLR generates, for example, three authentication vectors, including sequence numbers generated based on the maximum sequence number and three consecutive memory addresses sequentially increased from the relevant memory address by 1, for example, A[11], B[12], and C[13], and transmits the authentication vectors to the VLR/SGSN. The VLR/SGSN transmits an authentication vector including A[11] to the relevant mobile station, and the mobile station performs re-authentication by comparing a sequence number stored in the memory address [11] included in the authentication vector with A.

The HE/HLR transmits the three authentication vectors to the VLR/SGSN, and then generates and stores three authentication vectors for subsequent memory addresses. For example, three authentication vectors respectively including D[14], E[15], and F[16] are generated and stored.

However, when the memory address [11] is impaired and re-authentication fails, a message including 550[10] which is the maximum sequence number [memory address] used in the failed authentication is sent to the VLR/SGSN. The VLR/SGSN transmits a network fail message to the mobile station in conformity with a standard procedure for re-authentication failure to allow the mobile station to again attempt to request authentication, and transfers only information about re-authentication failure to the HE/HLR. Upon re-authentication failure, the VLR/SGSN deletes all previously-stored authentication vectors.

When the mobile station, having received NetworkFail message from the VLR/SGSN, requests authentication again after several seconds in conformity with the standard, the VLR/SGSN requests an authentication vector from the HE/HLR because of the absence of the previously-stored authentication vector(s). The HE/HLR further transmits three authentication vectors including previously generated/stored D[14], E[15], and F[16] to the VLR/SGSN, and then the VLR/SGSN transmits the authentication vector including D[14] to the mobile station.

In this case, if the memory address [14] is also impaired, authentication fails again, and then the mobile station requests re-authentication from the VLR/SGSN by transmitting 550[10] which is the maximum sequence number [memory address] to the VLR/SGSN. As described above, since the authentication vectors for [11] and [14], at which memory addresses are impaired, are transmitted to the mobile station, the entire procedure including authentication failure, re-authentication failure, and an authentication request after several seconds is continuously repeated, and the failure of authentication is repeated, thus preventing call service from being provided to the mobile station.

In this way, in the conventional USIM authentication method, when an insignificant amount of damage is caused on USIM memory, and then sequence numbers are changed to an abnormal state, and authentication vectors including impaired memory addresses are received, the above procedure including authentication failure, re-authentication failure, and an authentication request is infinitely repeated. Therefore, in order to be provided with call service as a result of successful authentication, an existing USIM must be replaced with a USIM having non-damaged memory, thus incurring additional costs for the replacement of the USIM.

DETAILED DESCRIPTION OF THE INVENTION

An object according to embodiments of the present invention made keeping in mind the above problems is to provide a method and system for authenticating a USIM, which generate an authentication vector while avoiding impaired memory addresses that may result from physical damage to memory provided in the USIM, thus preventing the failure of authentication attributable to the damaged memory, and the impossibility of providing call service attributable to such an authentication failure.

Another object according to embodiments of the present invention is to provide a method and system for authenticating a USIM, which prevent problems that may occur due to damaged memory, thus reducing potential costs that may incur in replacing the USIM.

In order to accomplish the above objects, a method of authenticating a Universal Subscriber Identity Module (USIM) according to an embodiment of the present invention may include determining whether a memory address of a USIM has been stored when an authentication-related message for the USIM is received via a mobile switching center (VLR/SGSN); if it is determined that the memory address has been stored, updating the memory address to a first memory address increased from the memory address by a predetermined value; generating an authentication vector including the first memory address; and transmitting the authentication vector to the USIM via the mobile switching center so that the USIM can perform authentication using the authentication vector.

The method may further include, if the memory address has not been stored, and a re-authentication failure message is received via the mobile switching center, storing a memory address transmitted to the USIM in response to a re-authentication request.

The method may further include, if the memory address has been stored, calculating a number of receptions of the authentication-related message after the memory address has been stored; and comparing the number of receptions with a preset reference number of times, wherein if the number of receptions is less than the reference number of times, the updating may be performed.

Further, the method may further include, if the number of receptions is equal to or greater than the reference number of times, selecting any one from among memory addresses prior to a pre-stored memory address; and generating the authentication vector including the selected memory address.

The method may further include, if authentication of the USIM has succeeded, deleting the stored memory address.

A method of authenticating a Universal Subscriber Identity Module (USIM) according to another embodiment of the present invention may include generating a random value when an authentication-related message for a USIM is received via a mobile switching center (VLR/SGSN); dividing the generated random value by a preset memory address, and then calculating a remainder of the division; generating an authentication vector in which the calculated remainder is set to a memory address; and transmitting the authentication vector to the USIM via the mobile switching center so that the USIM can perform authentication using the authentication vector.

The generating the random value may be configured to determine whether a memory address of the USIM has been stored when the authentication-related message is received, and to generate the random value if it is determined that the memory address has been stored.

The preset memory address may be either the stored memory address or a memory address included in the authentication-related message.

A system for authenticating a Universal Subscriber Identity Module (USIM) according to a further embodiment of the present invention may include a determination unit for determining whether a memory address of a USIM has been stored when an authentication-related message for the USIM is received via a mobile switching center (VLR/SGSN); a storage unit for, if it is determined that the memory address has been stored, updating the memory address to a first memory address increased from the memory address by a predetermined value; a generation unit for generating an authentication vector including the first memory address; and a transmission unit for transmitting the authentication vector to the USIM via the mobile switching center so that the USIM can perform authentication using the authentication vector.

The system may further include a calculation unit for, if it is determined by the determination unit that the memory address has been stored, calculating a number of receptions of the authentication-related message after the memory address has been stored; and a comparison unit for comparing the number of receptions with a preset reference number of times, wherein the storage unit may update the memory address to the first memory address if the number of receptions is less than the reference number of times as a result of the comparison by the comparison unit.

The system may further include a first calculation unit for, if the number of receptions is equal to or greater than the reference number of times as the result of the comparison by the comparison unit, generating a random value, and calculating a remainder obtained by dividing the random value by a pre-stored memory address, wherein the generation unit may generate the authentication vector in which the remainder is set to a memory address.

A system for authenticating a Universal Subscriber Identity Module (USIM) according to another aspect of the present invention may include a calculating unit for, when an authentication-related message for a USIM is received via a mobile switching center, generating a random value, and calculating a remainder obtained by dividing the random value by a preset memory address; a generation unit for generating an authentication vector in which the calculated remainder is set to a memory address; and a transmission unit for transmitting the authentication vector to the USIM via the mobile switching center (VLR/SGSN) so that the USIM can perform authentication using the authentication vector.

DESCRIPTION OF REFERENCE CHARACTERS OF IMPORTANT PARTS

Figure 1:
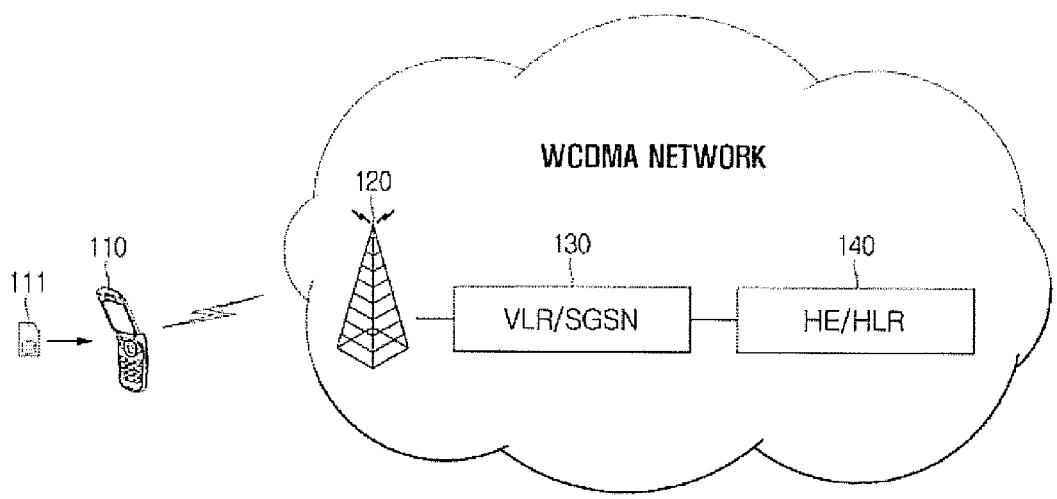
FIG. 1 is a diagram showing a system for authenticating a USIM according to an embodiment of the present invention.

140: authentication server or HE/HLR
210: determination unit
220: calculation unit
230: comparison unit
240: storage unit
250: generation unit
260: first calculation unit
270: transmission unit

BEST MODE

The above and other objects and features of the present invention will be more clearly understood from the following detailed description of embodiments taken in conjunction with the accompanying drawings.

Preferred embodiments of the present invention will be described in detail with reference to the attached drawings. In the description of the present invention, detailed description of related well-known components or functions will be omitted.

Hereinafter, a method and system for authenticating a Universal Subscriber Identity Module (USIM) according to embodiments of the present invention will be described in detail with reference to FIGS. 1 to 7.

A USIM has a form in which a Subscriber Identity Module (SIM) card equipped with subscriber information is combined with a Universal Integrated Circuit Card (UICC), and is configured such that various functions such as user authentication, global roaming and electronic commerce functions are implemented in a single card, the USIM being mounted on a 3rd generation (3G) mobile communication (e.g., Wideband Code Division Multiple Access: WCDMA) mobile station.

A SIM is a card-type module that can be used in a mobile phone and is configured to store personal information so that various types of services such as authentication, charging fees, and a security function can be provided to each subscriber. The USIM has evolved from such a SIM by one step and is a small-sized chip essentially inserted into an asynchronous 3G WCDMA mobile station.

The USIM is used both as a SIM capable of performing subscriber authentication and as a universal IC card (UICC) capable of including the functions of a transportation card or a credit card. The UICC can guarantee the integrity and security of all personal information data by supporting the security of various multiple applications.

Such a USIM is composed of a small-sized Central Processing Unit (CPU) and memory, wherein the CPU identifies a user using encryption and decryption functions, and the memory is used as a storage space for a supplementary service. In the memory, functions such as that of a credit card, a transportation card or a membership card can be stored, and in particular, a service/function can be installed in a wireless manner without a separate chip being used, as long as approval for banking or card services is obtained using Over The Air (OTA) technology.

The gist of the present invention is to prevent the failure of the authentication of the USIM that may occur due to the physically damaged USIM during a UMTS AKA procedure, and also prevent the impossibility of providing call service due to such an authentication failure.

FIG. 1 illustrates a system for authenticating a USIM according to an embodiment of the present invention.

Referring to FIG. 1, the USIM authentication system includes a mobile station 110, a VLR/SGSN 130, and an HE/HLR 140.

The mobile station 110 is a communication device equipped with a USIM 111 for user authentication and capable of performing wireless communication over a WCDMA network and is configured to be able to perform communication, such as calling to another mobile station or any server, message sending, and accessing websites, via the VLR/SGSN 130 while communicating in a wireless manner with the base station 120 of the WCDMA network. The mobile station may be referred to as MS and the VLR/SGSN may be referred to as VLR/SGSN in this specification as well as in other literatures.

Such a mobile station 110 requests the authentication of the USIM required to use a mobile communication service from the HE/HLR 140 via the VLR/SGSN 130, receives an authentication vector required for USIM authentication from the HE/HLR 140 via the VLR/SGSN 130 and then authenticates the USIM. The authentication server may be referred to as HE, HE/HLR or HE/AuC in this specification as well as in other literatures.

The USIM 111 performs authentication using a sequence number and a memory address included in the authentication vector and determines that authentication has succeeded if preset authentication conditions are satisfied; otherwise, it determines that authentication has failed.

Here, the authentication conditions are given such that a sequence number SQN_USIM, stored in the memory address of the USIM included in the authentication vector, must be less than a sequence number SQN_AUC included in the authentication vector, and the sequence number SQN_AUC included in the authentication vector must be less than the sum of the maximum sequence number SQN_MAX stored in the USIM and a preset value (Delta=$2^{28}$) That is, the USIM determines that authentication has succeeded if both the two conditions of "SQN_AUC>SQN_USIM" and "SQN_AUC<SQN_MAX÷Delta" are satisfied and that authentication has failed if either of the two conditions is not satisfied.

In this case, the maximum sequence number is not a value searched for in sequence numbers stored in a plurality of arrays provided in the memory, but a value pre-stored in a separate storage space. Depending on the circumstances, the maximum sequence number stored in the relevant storage space may also be used.

If authentication has failed, the USIM 111 transmits both the maximum sequence number, among the sequence numbers stored in the memory, and a memory address at which that value is stored, to the VLR/SGSN 130, and then receives an authentication vector newly generated by the HE/HLR 140 via the VLR/SGSN 130 and can perform an authentication procedure again using the received authentication vector.

Further, if the authentication of the USIM has failed and the re-authentication of the USIM fails, the mobile station 110 sends an authentication request message for requesting authentication again after a predetermined time has elapsed. In the present invention, a memory address, which is included in an authentication vector received in response to an authentication request after the failure of re-authentication, or a memory address, which is included in an authentication vector required for re-authentication, is either a memory address increased by a predetermined value without having the same memory address or a memory address at which authentication succeeded before, unlike the conventional scheme. Accordingly, even if part of the memory address is impaired due to damage to the memory or the USIM, it is possible that authentication can succeed, and thus, call service can be provided.

When receiving a message related to authentication, for example, an authentication request message or a message including the maximum sequence number and a relevant memory address in response to authentication failure, from the mobile station 110, the VLR/SGSN 130 sends the authentication-related message to the HE/HLR 140, and receives an authentication vector from the HE/HLR 140 and then transmits the authentication vector to the mobile station 110 so that authentication can be performed by the USIM 111.

In this case, the authentication-related message is one of an authentication request message, an authentication failure message and a re-authentication failure message. The VLR/SGSN 130 may send an authentication request message to the HE/HLR 140 when an authentication request message is received from the mobile station 110, may send an authentication failure message to the HE/HLR 140 when a message attributable to authentication failure is received, and may send a re-authentication failure message to the HE/HLR 140 when a message attributable to the failure of re-authentication is received. Further details thereof are apparent to those skilled in the art, and thus a detailed description thereof will be omitted.

The VLR/SGSN 130 determines that the authentication of the user has succeeded if authentication by the USIM 111 is a success, and then provides a requested mobile communication service to the mobile station 110.

When the authentication-related message is received from the VLR/SGSN 130, the HE/HLR 140 generates an authentication vector including both a sequence number and the memory address of the USIM and transmits the authentication vector to the mobile station 110 via the VLR/SGSN 130. In the present invention, when a re-authentication failure message is received, the HE/HLR 140 stores the memory address of the USIM transmitted to the mobile station 110 in response to the re-authentication request. In the state in which the relevant memory address of the USIM has been stored, when an authentication-related message, for example, an authentication request message, is received from the VLR/SGSN 130, the HE/HLR 140 generates an authentication vector that includes a memory address increased from the stored memory address by a predetermined value, for example, "1" or "2", and a sequence number generated using the private key of the USIM and transmits the authentication vector to the mobile station 110 via the VLR/SGSN 130.

In this case, the HE/HLR 140 may update the stored memory address to a memory address increased by a predetermined value and then store the updated memory address and may delete the stored memory address if the authentication by the USIM has succeeded using the transmitted authentication vector.

That is, if the authentication request message or the authentication failure message is received in the state in which the memory address of the relevant USIM has been stored, the HE/HLR 140 increases the memory address, transmitted with the memory address included in the authentication vector, by a predetermined value. As a result, when the memory address included in the authentication vector is a memory address at which a failure has occurred in the memory, the conventional problem related to having the same memory address, that is, the infinite repetition of the procedure including an authentication request, authentication failure, and re-authentication failure, can be prevented. By way of this operation, the memory address at which a failure has occurred in the memory may be avoided, and then an authentication procedure based on normal memory addresses may be performed.

In the memory of the USIM, a plurality of consecutive memory addresses may be impaired due to physical impact damage or the like. Accordingly, when authentication has failed due to a first memory address that has been initially impaired, an authentication procedure may be infinitely repeated in the presence of the consecutively impaired memory addresses. Accordingly, a method may be additionally performed which calculates the number of times that the authentication-related message is received from the VLR/SGSN 130 in the state in which the memory address has been stored, where the method can generate normal memory addresses when the calculated number of receptions is equal to or greater than the preset reference number of times (for example, 3 times).

In this case, as an example of a method of generating normal memory addresses, any one of memory addresses prior to the stored memory address, for example, any one of addresses [0] to [10] when the stored memory address is assumed to be [11], is included in an authentication vector and the authentication vector is to be transmitted only because authentication may succeed at a prior memory address existing before authentication failed. There may be various methods capable of including the memory address prior to the memory address stored in the HE/HLR 140 in the authentication vector and transmitting the authentication vector. For example, a random value may be generated, and such a random value RND may be divided by a stored memory address A, and a memory address corresponding to the remainder (RND mod A) of the division may be included in the authentication vector.

Here, the HE/HLR 140 may sequentially use a method of increasing the memory address included in the authentication vector by a predetermined value and a method of using the remainder obtained by dividing the generated random value by the stored memory address on the basis of certain conditions, but may also perform the authentication procedure using only the remainder.

In this case, the random value may be a value generated based on the memory address of the relevant USIM stored in the HE/HLR 140.

That is, when an authentication-related message is received from the VLR/SGSN 130, the HE/HLR 140 determines whether the memory address of the relevant USIM has been stored, generates a random value and divides the random value by a stored memory address if it is determined that the memory address has been stored, generates an authentication vector including both a memory address corresponding to the remainder of the division and a sequence number, and transmits the authentication vector to the mobile station 110 via the VLR/SGSN 130, thus reducing the number of authentication failures that may occur due to the damaged memory of the USIM and increasing the probability of success in authentication.

Furthermore, when an authentication failure message including the maximum sequence number and [memory address] is received from the VLR/SGSN regardless of whether the memory address has been stored, the HE/HLR 140 may generate an authentication vector using a memory address prior to the memory address included in the message, and transmit the authentication vector to the mobile station 110 via the VLR/SGSN 130, thus increasing the probability of success in authentication in the USIM.

Here, there may be various methods of generating a memory address prior to a memory address having the maximum sequence number. For example, after the above-described random value has been generated, the remainder obtained by dividing the random value by the received memory address may be generated as a memory address included in the authentication vector.

In this way, the system for authenticating the USIM according to the embodiment of the present invention generates an authentication vector by avoiding impaired memory addresses at which a failure occurred due to the damaged memory of the USIM, so that the repetition of the authentication failure, which may occur because of the impaired memory addresses, and the impossibility of providing call service due to the authentication failure can be prevented, and in addition, the replacement of a USIM attributable to an insignificant amount of damage to the memory can be prevented to reduce the potential cost of replacing the USIM.

Figure 2:
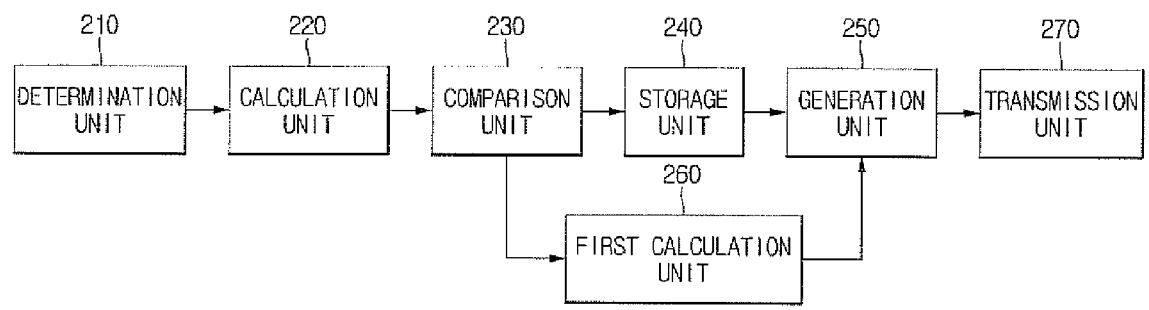
FIG. 2 is a diagram showing the construction of an embodiment of the HE/HLR of FIG. 1.

FIG. 2 is a diagram showing the construction of an embodiment of the HE/HLR of FIG. 1.

Referring to FIG. 2, the HE/HLR 140 includes a determination unit 210, a calculation unit 220, a comparison unit 230, a storage unit 240, a generation unit 250, a first calculation unit 260, and a transmission unit 270.

When an authentication-related message for the USIM (for example, any one of an authentication request message, an authentication failure message and a re-authentication failure message) is received from the VLR/SGSN, the determination unit 210 determines whether the memory address of the relevant USIM has been stored.

If the HE/HLR transmits an authentication vector required for re-authentication to the USIM in the state in which the memory address of the USIM is not stored and thereafter receives a re-authentication failure message via the VLR/SGSN, the HE/HLR may store the memory address of the authentication vector transmitted to the USIM upon re-authentication, that is, the memory address included in the authentication vector.

The reason for this is that the relevant memory address may be a memory address at which a failure occurred due to the physically damaged USIM, and thus the stored memory address should be avoided when an authentication-related message is subsequently received.

That is, whether the memory address of the USIM is stored denotes whether the re-authentication of the USIM has failed. The fact that the memory address is stored means that even re-authentication has failed. The fact that the memory address is not stored means that authentication has succeeded before re-authentication has failed.

If it is deter mined by the determination unit 210 that the memory address has been stored, the calculation unit 220 calculates the number of receptions of the authentication-related message that is received from the VLR/SGSN after the memory address has been stored.

That is, the calculation unit 220 is configured to calculate the number of failures in the authentication of the USIM after the memory address has been stored.

The comparison unit 230 compares the number of receptions calculated by the calculation unit 220 with the preset reference number of times.

Here, the reference number of times is configured to prevent authentication failure from being continuously repeated due to the impairment of a plurality of consecutive memory addresses while the stored memory address is continuously updated.

The storage unit 240 updates the memory address by increasing the stored memory address by a predetermined value when, as a result of the comparison by the comparison unit 230, the calculated number of receptions is less than the preset reference number of times.

That is, the stored memory address is updated to another value so that a memory address to be included in the authentication vector is changed.

The first calculation unit 260 generates a random value, divides the generated random value by the pre-stored memory address, and then obtains the remainder of the division if, as the result of the comparison by the comparison unit 230, the calculated number of receptions is equal to or greater than the reference number of times.

In this case, the random value may be generated using the pre-stored memory address of the relevant USIM, and the memory address by which the random value will be divided may be either a memory address that is currently stored, or a memory address that is stored due to a re-authentication failure.

The generation unit 250 generates an authentication vector in such a way as to generate an authentication vector including the memory address updated by the storage unit 240 and a sequence number if the calculated number of receptions is less than the reference number of times as the result of the comparison by the comparison unit 230, and to generate an authentication vector including a memory address corresponding to the remainder calculated by the first calculation unit 260 and a sequence number if the calculated number of receptions is equal to or greater than the reference number of times as the result of the comparison by the comparison unit 230.

The transmission unit 270 transmits the authentication vector generated by the generation unit 250 to the mobile station via the VLR/SGSN so that the USIM can perform authentication.

Figure 3:
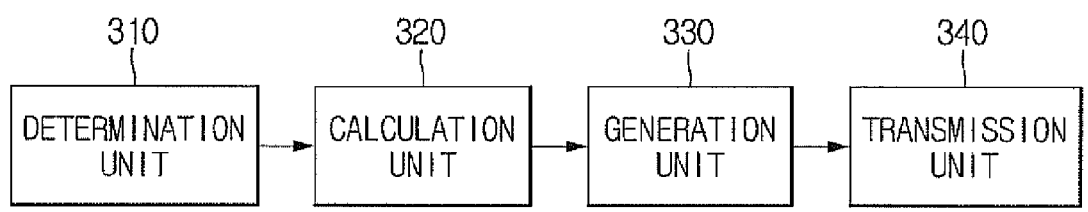
FIG. 3 is a diagram showing the construction of another embodiment of the HE/HLR of FIG. 1.

FIG. 3 is a diagram showing the construction of another embodiment of the HE/HLR of FIG. 1.

Referring to FIG. 3, the HE/HLR 140 includes a determination unit 310, a calculation unit 320, a generation unit 330, and a transmission unit 340.

The determination unit 310 performs the same operation as the determination unit 210 of FIG. 2. That is, the determination unit 310 determines whether the memory address of a USIM has been stored when an authentication-related message for the USIM is received from a VLR/SGSN.

If it is determined by the determination unit 310 that the memory address of the USIM has been stored, the calculation unit 320 generates a random value and calculates a remainder obtained by dividing the random value by the stored memory address of the USIM.

The generation unit 330 generates an authentication vector including both a memory address of the USIM, corresponding to the remainder calculated by the calculation unit 320, and a sequence number.

The transmission unit 340 transmits the authentication vector generated by the generation unit 330 to the mobile station via the VLR/SGSN.

Figure 4:
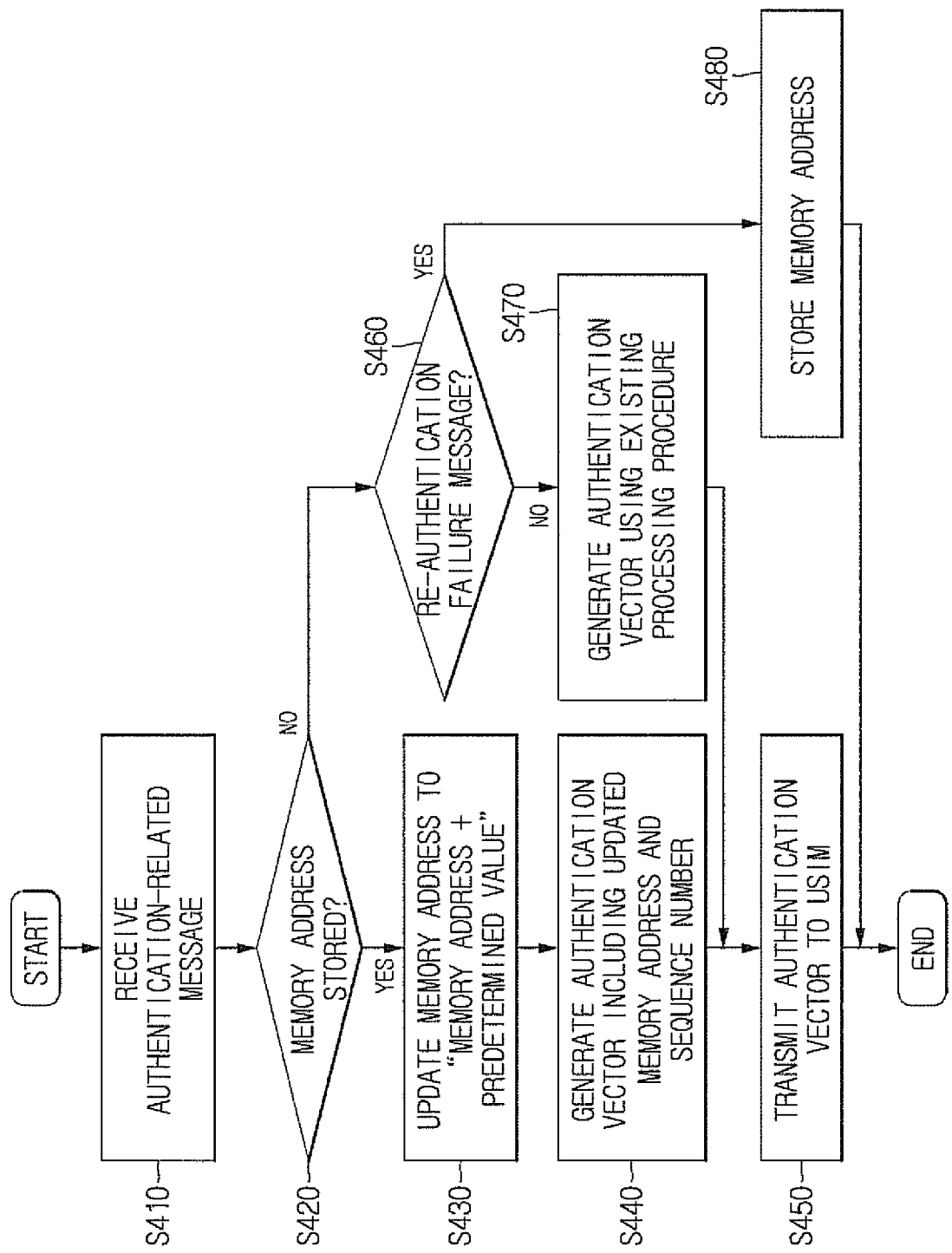
FIG. 4 is an operating flowchart showing a method of authenticating a USIM according to an embodiment of the present invention.

FIG. 4 is an operating flowchart showing a method of authenticating a USIM according to an embodiment of the present invention.

Referring to FIG. 4, in the USIM authentication method, when an authentication-related message for a USIM is received via a VLR/SGSN, it is determined whether the memory address of the USIM has been stored at steps S410 and S420.

Here, the authentication-related message may be any one of an authentication request message, an authentication failure message, and a re-authentication failure message.

If it is determined at step S420 that the memory address of the USIM has not been stored, it is determined whether the authentication-related message is a re-authentication failure message. If it is determined that the authentication-related message is not a re-authentication failure message, that is, if the authentication-related message is an authentication request message or an authentication failure message, an authentication vector is generated using the same processing procedure as the existing procedure, and is transmitted to the mobile station equipped with the USIM via the VIR/SGSN, thus enabling the USIM to perform authentication using the authentication vector at steps S460, S470, and S450.

For example, if an authentication request message is received at step S460, a sequence number is generated using the private key of the USIM, a memory address is generated depending on a predetermined format, and an authentication vector including both the memory address and the sequence number is generated and is then transmitted to the USIM. If an authentication failure message is received, a sequence number is generated using the private key of the USIM, and an authentication vector including both a memory address increased from a memory address at which the maximum sequence number transmitted from the USIM is stored by '1' and the sequence number is generated and is then transmitted to the USIM.

Meanwhile, if it is determined at step S460 that the received authentication-related message is a re-authentication failure message, a memory address included in a previous authentication vector, that is, an authentication vector required for re-authentication, is stored at step S480.

Here, the time at which the memory address is stored may be designated as the time when the re-authentication failure message is received as in the case of step S480, but the memory address may also be stored when an authentication vector required for re-authentication is transmitted.

If it is determined at step S420 that the memory address has been stored, the memory address is updated to a memory address increased from the stored memory address by a predetermined value, for example, a first memory address (the stored memory address+the predetermined value), as a new memory address, at step S430.

When the memory address is updated to the first memory address (the stored memory address+the predetermined value), an authentication vector including both a sequence number, which is generated using the private key of the USIM, and the updated first memory address is generated and is then transmitted to the USIM via the VLR/SGSN so that the USIM can perform authentication using the generated authentication vector at steps S440 and S450.

Here, if the authentication of the USIM has succeeded in the state in which the memory address is stored, the stored memory address is deleted, so that when an authentication-related message is subsequently received, an authentication vector may be generated using the existing processing procedure or, alternatively, a new memory address may be stored.

As described above, in the USIM authentication method according to the embodiment of the present invention, a memory address, for example, the impaired memory address [11], is stored so as to prevent repeated authentication failure and the impossibility of providing the call service due to the authentication failure from occurring when a procedure is repeatedly performed such that when the USIM performs re-authentication using an authentication vector including an impaired memory address 610 in a certain region, as in the case of an example shown in FIG. 6(a), authentication fails, and such that when an authentication request is received from the mobile station after several seconds, the HE/HLR retransmits the authentication vector including the impaired memory address 610. Thereafter, when an authentication-related message is received from the USIM, an authentication vector including a memory address [13] increased from the stored memory address [11] by a predetermined value, for example, "2", is transmitted to the USIM. Further, when authentication has failed again, an authentication vector including a memory address [15] increased from the memory address by "2" is transmitted to the USIM, thus enabling the authentication to succeed. That is, the authentication procedure is performed by avoiding impaired memory addresses, so that the inconvenience felt by the user can be eliminated by preventing authentication failures and the impossibility of providing call service from occurring, and so that authentication can be performed using a USIM with an insignificant amount of damage to reduce costs that may be incurred by replacing a USIM.

Depending on the circumstances, when consecutive memory addresses 620 are impaired due to the physically damaged memory of the USIM as in the case of an example shown in FIG. 6(b), the failure of authentication may be infinitely repeated because of the consecutively impaired memory addresses 620 if the authentication procedure is performed using only the method of FIG. 4. Accordingly, when the authentication failure is repeated a predetermined number of times or more, it is determined that the consecutively impaired memory addresses 620 are present, and then it is preferable to additionally implement a method capable of avoiding such consecutively impaired memory addresses. This method will be described in detail with reference to FIG. 5.

Figure 5:
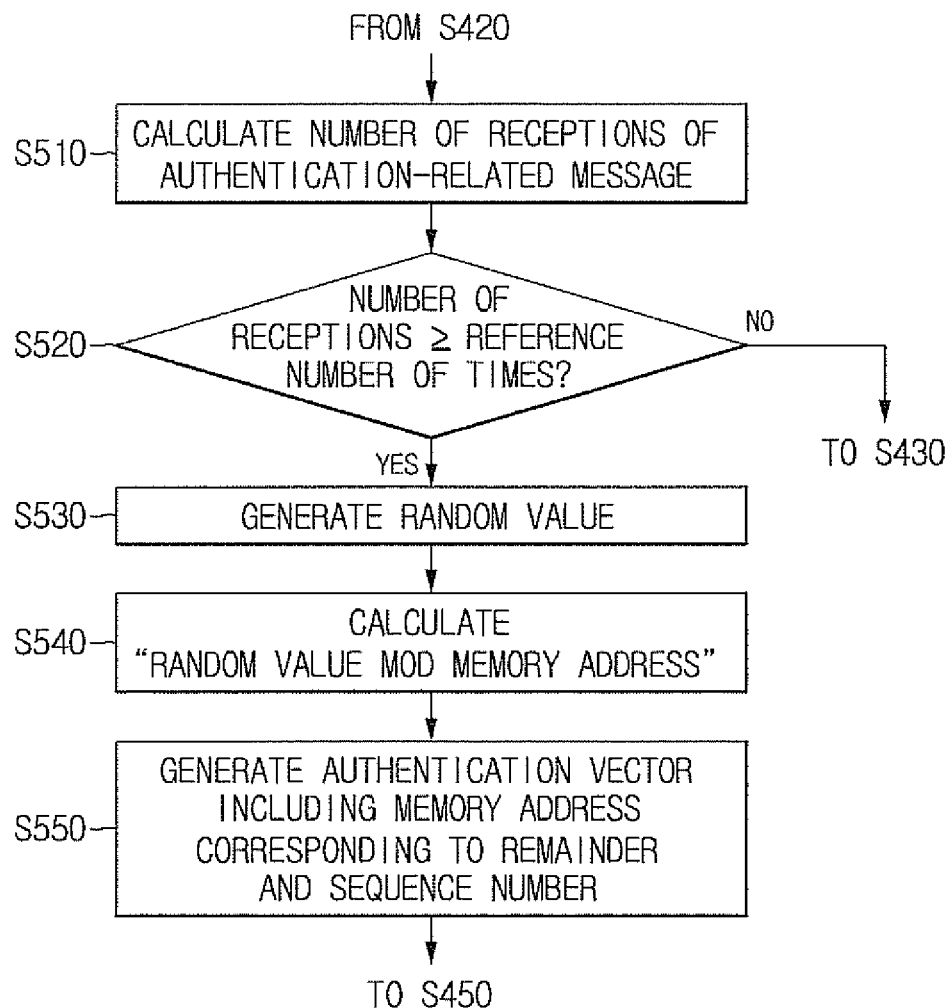
FIG. 5 is an additional operating flowchart showing the USIM authentication method of FIG. 4.
Figure 6:
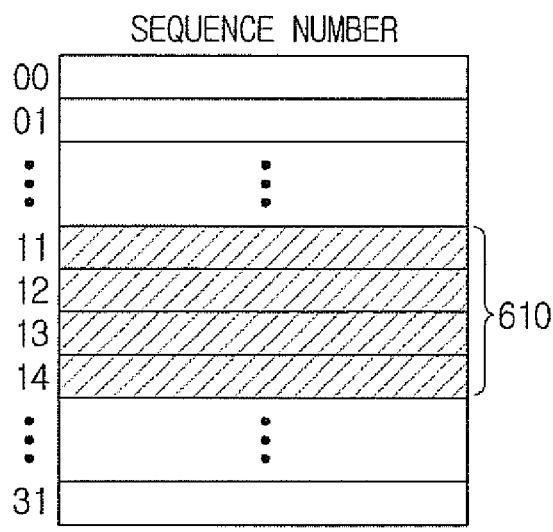
FIG. 6 is a diagram illustrating damaged memory to describe the present invention.
Figure 6:
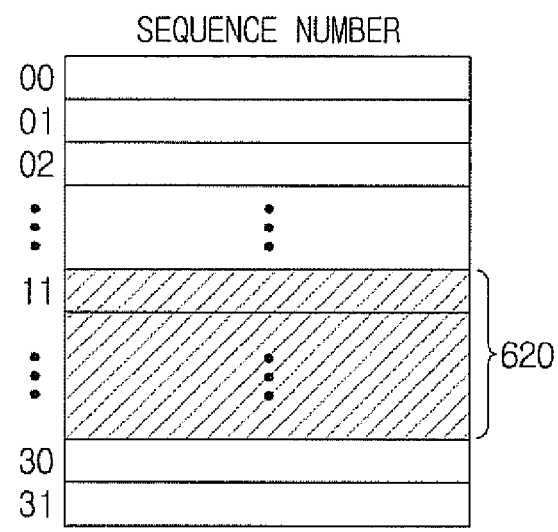

FIG. 5 is an additional operating flowchart showing the USIM authentication method of FIG. 4.

Referring to FIG. 5, when a memory address is currently stored at step S420 of FIG. 4, the number of times an authentication-related message is received via a VLR/SGSN is calculated at step S510.

That is, the number of receptions of the authentication-related message after the memory address has been stored is calculated, and it can be determined that the memory addresses of the USIM are consecutively impaired depending on the number of receptions after re-authentication has failed.

Thereafter, the calculated number of receptions is compared with the preset reference number of times, for example, three times, and then it is determined whether the calculated number of receptions is equal to or greater than the reference number of times at step S520.

If it is determined at step S520 that the number of receptions is equal to or greater than the reference number of times, it is determined that memory addresses are consecutively impaired, and then a random value is generated at step S530.

In this case, the random value may be generated either using the stored memory address or using a random function capable of generating a random value.

When the random value is generated, the random value is divided by the stored memory address, and the remainder of the division, that is, a remainder using "random value mod memory address" is calculated at step S540.

Here, the memory address used may be either a memory address that has been updated and is currently being stored or a memory address that was stored first, and a memory address to be applied may vary depending on the circumstances.

Once the remainder has been calculated, an authentication vector including both a memory address corresponding to the remainder and a sequence number generated using the private key of the USIM is generated at step S550, and the authentication vector is then transmitted to the USIM at step S450.

As seen in the above procedure, if it is assumed that the memory address used to calculate the remainder is the first memory address [11] at which impairment occurred in FIG.

6(b), a memory address corresponding to the remainder and included in the authentication vector corresponds to [00] to [10] at which authentication succeeded, and thus authentication can succeed using the authentication vector including the relevant memory address.

If it is determined at step S520 that the number of receptions is less than the reference number of times, step S430 in FIG. 4 is performed.

Figure 7:
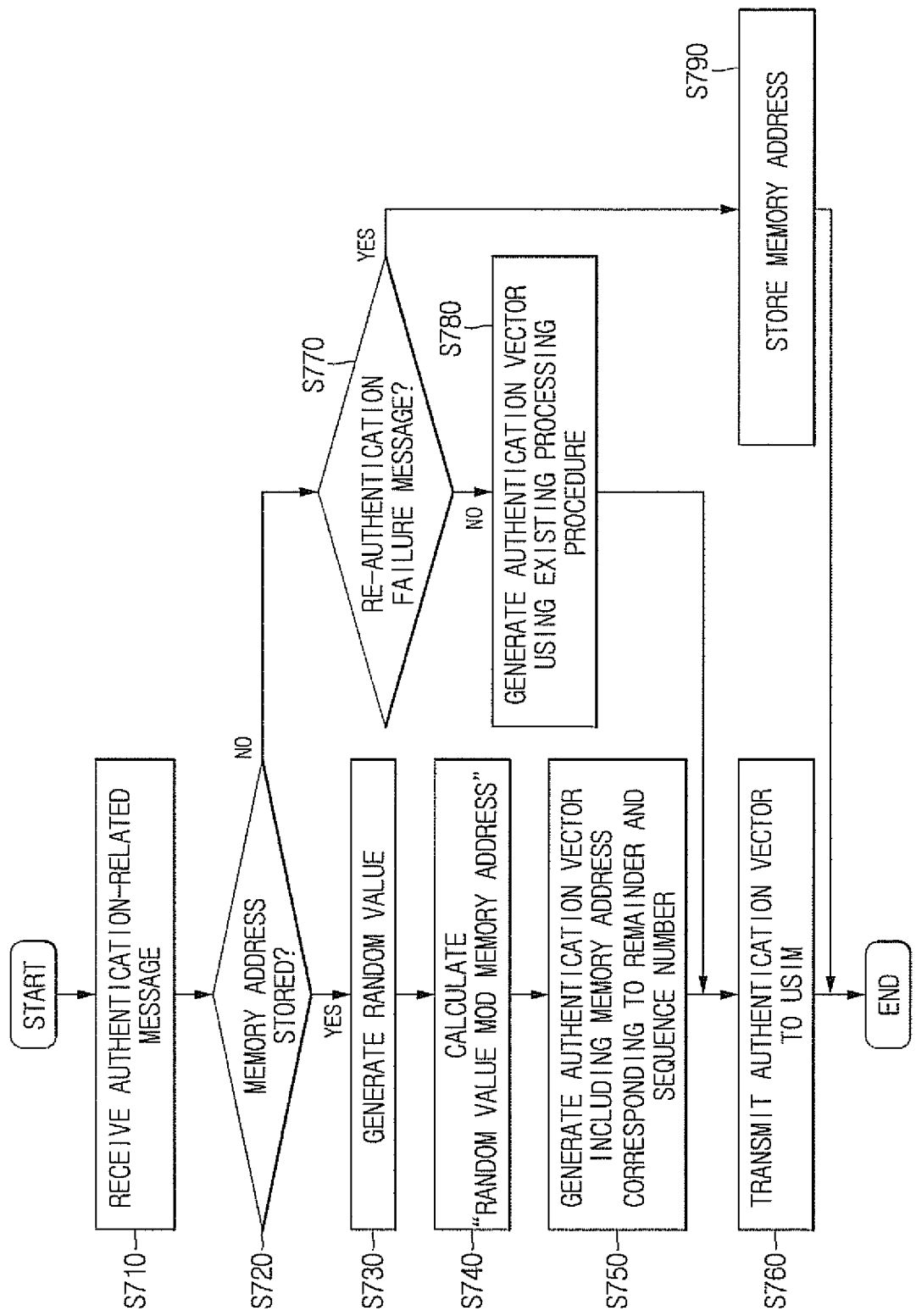
FIG. 7 is an operating flowchart showing a method of authenticating a USIM according to another embodiment of the present invention.

FIG. 7 is an operating flowchart showing a method of authenticating a USIM according to another embodiment of the present invention.

Referring to FIG. 7, in the USIM authentication method, when an authentication-related message for a USIM is received via a VLR/SGSN, it is determined whether the memory address of the USIM has been stored at steps S710 and S720.

Here, the authentication-related message may be one of an authentication request message, an authentication failure message, and a re-authentication failure message.

If it is determined at step S720 that the memory address of the USIM has not been stored, it is determined whether the authentication-related message is a re-authentication failure message. If it is determined that the authentication-related message is an authentication request message or an authentication failure message, rather than a re-authentication failure message, an authentication vector is generated using the same processing procedure as the existing procedure, and is then transmitted to the mobile station equipped with the USIM via the VLR/SGSN, thus allowing the USIM to perform authentication using the authentication vector at steps S770, S780, and S760.

If it is determined at step S770 that the received authentication-related message is a re-authentication failure message, a memory address that has been transmitted in a previous authentication vector is stored at step S790.

If it is determined at step S720 that the memory address has been stored, that is, if the authentication-related message is received after step S790 has been performed, a random value is generated either using the stored memory address or using a preset random function at step S730.

The generated random value is divided by the stored memory address, and then the remainder of the division is calculated at step S740.

That is, the remainder is calculated using "random value mod memory address".

Once the remainder has been calculated, an authentication vector including a memory address corresponding to the remainder and a sequence number generated using the private key of the USIM is generated at step S750.

For example, when it is assumed that the stored memory address among the memory addresses in FIG. 6(b) is [11], and the generated random value is "15", the remainder is "4", and the HE/HLR generates an authentication vector including both the memory address [04] corresponding to the remainder and the generated sequence number.

The generated authentication vector is transmitted to the mobile station equipped with the USIM via the VLR/SGSN, thus allowing the USIM to perform authentication using the authentication vector at step S760.

Further, although not shown in the drawings, the USIM authentication method according to the present invention is configured such that when an authentication failure message including both the maximum sequence number and [memory address] is received regardless of whether a USIM memory address has been stored, an authentication vector including a memory address prior to the memory address included in the message, for example, memory addresses [0] to [10] when the memory address included in the message is [11], may be generated, and the generated authentication vector may then be transmitted to the USIM.

In this way, the USIM authentication method according to another embodiment of the present invention is configured such that even if some addresses of USIM memory are impaired and the failure of authentication occurs, the memory address information of the USIM is stored, so that when an authentication-related message is subsequently received, a memory address at which there is a possibility of performing successful authentication is included in an authentication vector using the stored memory address, and then the authentication vector is transmitted to the USIM, thus allowing the USIM to succeed in authentication and the mobile station to be provided with call service.

Furthermore, even if part of the USIM memory is damaged, an authentication procedure is performed while avoiding impaired memory addresses, thus lengthening the usage period of the USIM and reducing the potential costs incurred in replacing the USIM.

The method and system for authenticating a USIM according to the present invention may be modified or applied in various forms within the scope of the technical spirit of the present invention, and are not limited to the above embodiments. Further, the embodiments and drawings are merely intended to describe the contents of the invention in detail, and are not intended to limit the scope of the technical spirit of the invention. In the above-described present invention, those skilled in the art will appreciate that various modifications, additions and substitutions are possible, without departing from the scope and spirit of the invention. Therefore, it is apparent that the present invention is not limited by the embodiments and the attached drawings, and the scope of the present invention should be defined by the accompanying claims and equivalents thereof.

The invention claimed is:

1. A method of authenticating a Universal Subscriber Identity Module (USIM), comprising:
   determining whether a memory address of a USIM is stored when an authentication-related message for the USIM is received;
   if it is determined that the memory address is stored, updating the memory address to a first memory address increased from the memory address by a set value;
   generating an authentication vector including the first memory address; and
   transmitting the authentication vector so that the USIM performs authentication using the authentication vector.

2. The method according to claim 1, wherein the authentication-related message is any one of an authentication request message, an authentication failure message, and a re-authentication failure message.

3. The method according to claim 1, further comprising:
   if the memory address is not stored and a re-authentication failure message is received, storing a memory address transmitted to the USIM in response to a re-authentication request.

4. The method according to claim 1, further comprising:
   if the memory address is stored, calculating a number of receptions of the authentication-related message after the memory address has been stored; and
   comparing the number of receptions with a set reference number of times,
   wherein if the number of receptions is less than the reference number of times, the updating is performed.

5. The method according to claim 4, further comprising:
if the number of receptions is equal to or greater than the reference number of times, selecting any one from among memory addresses prior to a pre-stored memory address; and
generating the authentication vector including the selected memory address.

6. The method according to claim 5, wherein the selecting of the memory address includes generating a random value, dividing the random value by the pre-stored memory address, and selecting a remainder of the division as a memory address.

7. The method according to claim 1, further comprising:
if authentication of the USIM is succeeded, deleting the stored memory address.

8. A system for authenticating a Universal Subscriber Identity Module (USIM), comprising:
a determination unit configured to determine whether a memory address of a USIM is stored when an authentication-related message for the USIM is received;
a storage unit configured to, if the memory address is stored, update the memory address to a first memory address increased from the memory address by a set value;
a generation unit configured to generate an authentication vector including the first memory address; and
a transmission unit configured to transmit the authentication vector so that the USIM performs authentication using the authentication vector.

9. The system according to claim 8, further comprising:
a calculation unit configured to, if the memory address is stored, calculate a number of receptions of the authentication-related message after the memory address has been stored; and
a comparison unit configured to compare the number of receptions with a set reference number of times,
wherein the storage unit is configured to update the memory address to the first memory address if the number of receptions is less than the reference number of times as a result of the comparison by the comparison unit.

10. The system according to claim 9, further comprising:
a first calculation unit configured to, if the number of receptions is determined to be equal to or greater than the reference number of times as the result of the comparison by the comparison unit, generate a random value and calculate a remainder obtained by dividing the random value by a stored memory address,
wherein the generation unit is configured to generate the authentication vector in which the remainder is set as a memory address.

* * * * *